United States Patent [19]

Sakamoto et al.

[11] Patent Number: 5,470,637

[45] Date of Patent: Nov. 28, 1995

[54] POLYESTER COMPOSITION AND BIAXIALLY ORIENTED POLYESTER FILM CONTAINING THE SAME

[75] Inventors: Jun Sakamoto; Minoru Yoshida; Masatoshi Aoyama, all of Mishima; Masaru Suzuki, Ito; Yukari Nakamori, Shiga; Iwao Okazaki; Koichi Abe, both of Kyoto, all of Japan

[73] Assignee: Toray Industries, Inc., Japan

[21] Appl. No.: 98,306

[22] PCT Filed: Dec. 9, 1992

[86] PCT No.: PCT/JP92/01605

§ 371 Date: Nov. 23, 1992

§ 102(e) Date: Nov. 23, 1992

[87] PCT Pub. No.: WO93/12177

PCT Pub. Date: Jun. 24, 1993

[30] Foreign Application Priority Data

| Dec. 9, 1991 | [JP] | Japan | 3-324745 |
| Dec. 13, 1991 | [JP] | Japan | 3-330172 |
| Dec. 26, 1991 | [JP] | Japan | 3-343814 |
| Dec. 26, 1991 | [JP] | Japan | 3-343818 |
| May 21, 1992 | [JP] | Japan | 4-128918 |

[51] Int. Cl.$^6$ .............. B32B 27/06; C08K 3/18
[52] U.S. Cl. .............. 428/143; 428/480; 428/694 ST; 428/910; 521/92; 521/182; 524/430; 264/235.8; 264/290.2
[58] Field of Search .............. 524/430; 521/182, 521/92; 264/235.8, 290.2; 428/143, 480, 694 ST, 910

[56] References Cited

FOREIGN PATENT DOCUMENTS

| 53-71154 | 6/1978 | Japan . |
| 53-114894 | 10/1978 | Japan . |
| 59-41330 | 3/1984 | Japan . |
| 60-58431 | 4/1985 | Japan . |
| 60-139750 | 7/1985 | Japan . |
| 61-23623 | 2/1986 | Japan . |
| 2-155934 | 6/1990 | Japan . |
| 2-185522 | 7/1990 | Japan . |
| 2-214732 | 8/1990 | Japan . |
| 2-214733 | 8/1990 | Japan . |
| 2-214734 | 8/1990 | Japan . |
| 3-24134 | 2/1991 | Japan . |

*Primary Examiner*—Morton Foelak
*Attorney, Agent, or Firm*—Austin R. Miller

[57] ABSTRACT

A thermoplastic polyester composition suited for preparing a film or fiber having excellent abrasion resistance, as well as a biaxially oriented polyester film consisting essentially of the polyester composition are disclosed. The thermoplastic polyester according to the present invention is characterized by comprising a thermoplastic polyester (A) and zirconium oxide particles (B) having monoclinic and/or tetragonal crystal structure.

8 Claims, 3 Drawing Sheets

Fig. 3

POLYESTER COMPOSITION AND BIAXIALLY ORIENTED POLYESTER FILM CONTAINING THE SAME

TECHNICAL FIELD

This invention relates to a thermoplastic polyester composition. More particularly, this invention relates to a polyester composition suited for preparing a film or a fiber having excellent abrasion resistance, which contains zirconium oxide particles having a specific crystal structure, that are added in the thermoplastic polyester.

BACKGROUND ART

Thermoplastic polyesters such as polyethylene terephthalates generally have excellent mechanical properties and chemical properties, so that they are widely used as molded articles such as films and fibers.

However, in processing the polyesters into molded articles, the polyesters have a problem that the production efficiency of the molded articles is low due to the low slipperiness of the polyesters. To overcome this problem, inert particles are conventionally dispersed in the polyester to give irregularities on the surface of the molded articles.

For example, Japanese Laid-open Patent Application (Kokai) No. 52-86471 discloses a method in which inorganic particles having a specific surface area are used, and Japanese Laid-open Patent Application (Kokai) No. 59-171623 discloses a method in which spherical colloidal silica having a particle size of 0.1–1 μm is used. However, since the affinity between the inert particles and the polyesters is generally not good, although these methods are effective for overcoming the problem about the slipperiness, the abrasion resistance and the scratch resistance of the molded articles are not satisfactory.

If the abrasion resistance of a molded article such as a film for magnetic tape is low, powder formed by the abrasion of the film is likely to be generated. As a result, in the process of coating a magnetic layer, spots at which the magnetic coating is not applied are formed, thereby causing drop out. Further, when a magnetic tape is used, since the magnetic tape is made to run while contacting with an apparatus for recording or regeneration, abrasion powder generated by the contact attach to the magnetic layer to cause drop out during recording and regeneration. Still further, generation of a material by abrasion in the calender step in the process of applying the magnetic layer largely decreases the ease of handling of the film in the production of magnetic recording films.

On the other hand, if the scratch resistance of a molded article, for example, a film for magnetic tape is low, scratches are easily formed in the film surface if a foreign matter is generated during the production process of the magnetic tape. As a result, drop out is caused and scratches are easily formed when the tape is made to run at a high speed in use.

Thus, both in the production of the magnetic tape and in use of the magnetic tape, the film for the magnetic tape must have abrasion resistance and scratch resistance.

To overcome this problem, surface treatments of the inert particles have been studied. For example, Japanese Laid-open Patent Application (Kokai) Nos. 63-221158 and 63-280763 disclose modification of the surfaces of colloidal silica particles with glycol group; Japanese Laid-open Patent Application (Kokai) No. 63-312345 discloses modification of the surfaces of colloidal silica particles with a coupling agent; and Japanese Laid-open Patent Application (Kokai) No. 62-235353 discloses surface treatment of calcium carbonate particles with a phosphorus-containing compound. Further, methods in which special particles are employed are proposed in, for example, Japanese Laid-open Patent Application (Kokai) No. 62-172031 (silicone particles) and Japanese Laid-open Patent Application (Kokai) No. 21-29230 (delta type aluminum oxide particles).

However, on the other hand, the conditions in which the films for magnetic tape are used are becomingly severer because higher performance of the magnetic tape and higher production efficiency are demanded. Therefore, the abrasion resistances and the scratch resistances of the films obtained by the above-described various methods are becomingly not sufficient.

DISCLOSURE OF THE INVENTION

An object of the present invention is to overcome the above-mentioned problems and to provide a thermoplastic polyester composition suitable for obtaining a film or a fiber having excellent abrasion resistance.

The above-mentioned object of the present invention can be accomplished by providing a polyester composition comprising a thermoplastic polyester and zirconium oxide particles having monoclinic and/or tetragonal crystal structure. The present invention also provides a biaxially oriented polyester film consisting essentially of the polyester composition according to the present invention.

The thermoplastic polyester composition according to the present invention is effective for exhibiting abrasion resistance when molded into fiber, film or the like, and is especially suited for magnetic tapes and the like which are repeatedly used under friction.

BEST MODE FOR CARRYING OUT THE INVENTION

As the thermoplastic polyester used in the present invention, any thermoplastic polyester may be employed as long as a film or fiber can be molded. Preferred examples of the thermoplastic polyester include polyethylene terephthalates, polytetramethylene terephthalates, polycyclohexylenedimethylene terephthalates, polyethylene-2,6-naphthalene dicarboxylates, polyethylene-1,2-bis(2-chlorophenoxy)ethane-4,4'-dicarboxylates and the like. Among these, polyethylene terephthalates and polyethylene-2,6-naphthalene dicarboxylates are especially preferred.

The polyester may contain as a copolymerized component a dicarboxylic acid such as adipic acid, isophthalic acid, sebacic acid, phthalic acid, 4,4'-diphenyldicarboxylic acid or an ester-forming derivative thereof; a dioxy compound such as polyethylene glycol, diethylene glycol, hexamethylene glycol, neopentyl glycol, polypropylene glycol; an oxycarboxylic acid such as p-(β-oxyethoxy)benzoic acid or an ester-forming derivative thereof.

It is preferred to copolymerize a compound having at least one sulfonic acid group or a metal sulfonate group in the polyester since a good dispersion of the zirconium oxide particles having monoclinic and/or tetragonal crystal structure is attained, so that the composition excels in filtration property and abrasion resistance. Examples of such a compound include 5-sodiumsulfoisophthalic acid and ester-forming derivatives thereof, 5-lithiumsulfoisophthalic acid and ester-forming derivatives thereof, and 5-sodiumsulforesorcin. Among these, 5-sodiumsulfoisophthalic acid and ester-forming derivatives thereof, and 5-lithiumsulfoisophthalic acid and ester-forming derivatives thereof are preferred. The content of the copolymerized compound having sulfonic acid group or metal sulfonate group is preferably 0.1–30 parts by weight, more preferably 0.1–5 parts by weight with respect to 100 parts by weight of the aromatic dicarboxylic acid or an ester-forming derivative thereof.

The thermoplastic polyester may preferably have a specific resistance in melted state of $5 \times 10^6$–$5 \times 10^9$ $\Omega \cdot cm$ since the composition has an excellent static casting property and abrasion resistance, so that uniform protrusions and good electromagnetic conversion characteristics are attained. The polyester having the specific resistance in melted state can be prepared by blending the zirconium oxide particles having monoclinic and/or tetragonal crystal structure together with one or more of alkaline earth metal compounds, alkaline metal compounds, zinc compounds, manganese compounds and phosphorus compounds.

The zirconium oxide particles employed in the present invention can be obtained from zirconium ores, that is, zircon and baddeleyite, which are naturally occurring in a large amount. The zirconium oxide can be obtained by, for example, the dry method in which the above-mentioned zircon or vaterite is melted to evaporate the impurities, or by the wet method in which the ores are dissolved in an alkali, the impurities are removed and then the resultant is sintered.

More particularly, zirconium oxide can be prepared by the following methods (1)–(4):

(1) The so called co-precipitation method in which sodium zirconate is prepared by dissolving zircon sand in an alkali such as sodium hydroxide, followed by collecting the sodium zirconate by filtration; the obtained sodium zirconate is neutralized with an acid and the formed zirconic acid is collected by filtration; hydrochloric acid is added to the resulting zirconic acid to convert the same into zirconium oxychloride; ammonium hydroxide or the like is added to the resulting zirconium oxychloride to form zirconium hydroxide; and after washing the resultant, the resultant is sintered at a temperature of not lower than 400° C., thereby obtaining zirconium oxide.

(2) The so called alkoxide method in which zirconium alkoxide is synthesized from zirconium metal and propylalcohol or the like; hydrolyzing the zirconium alkoxide to obtain zirconium hydroxide; sintering the thus obtained gel as it is or after peptization/granule-formation, thereby obtaining zirconium oxide.

(3) The so called hydrothermal method in which zirconium oxide is directly obtained by subjecting the material salt to a hydrothermal reaction under high pressure.

(4) The so called gas phase method in which zirconium chloride is hydrolyzed in flame under hydrogen and oxygen atmosphere, thereby obtaining zirconium oxide. Zirconium oxide having monoclinic crystal structure can be obtained, for example, by the above-described method (1) in which the sinter of zirconium hydroxide is carried out at 600°–1000° C., followed by pulverization of the obtained zirconium oxide.

The thus obtained zirconium oxide particles may take various forms depending on the production conditions, and those having a crystal form of monoclinic, tetragonal, cubic, rhombohedral, orthorhombic and mixtures thereof are known. Zirconium oxide particles containing calcium oxide, magnesium oxide, yttrium oxide or the like as a stabilizer are generally used.

The zirconium particles employed in the present invention are those having a crystal structure of monoclinic and/or tetragonal. The monoclinic and tetragonal crystal forms may be mixed. Zirconium particles having monoclinic crystal structure alone or having monoclinic crystal structure in a percentage of not less than 50% are preferred.

The crystal structure of the zirconium oxide particles can be identified by the value of the diffraction angle $2\theta$ at which a diffracted X-ray emerges in the X-ray diffraction method. A plurality of pairs of the standard values of $2\theta$ are known for each crystal structure. For example, in case of monoclinic crystal structure, the principle $2\theta$ values (degree, °) include 24.0, 24.4, 28.2, 31.5, 34.2, 34.4, 35.3, 40.7, 49.3, 50.1, 50.6, 54.1, and 55.4. In case of tetragonal crystal structure, the principle $2\theta$ values include 29.8, 34.0, 34.8, 49.5, 50.1 and 59.4. It is preferred to determine the $2\theta$ values according to JCPDS No. 37-1484 or 36-420 when the crystal structure is monoclinic, and according to JCPDS No. 24-1164 when the crystal structure is tetragonal.

Such zirconium oxide particles can be obtained by, for example, setting the sintering temperature in the above-described wet method to about 450°–2000° C., more preferably 600°–1000° C.

The specific surface area of the zirconium oxide particles determined by the B.E.T. method may preferably be not less than 10 $m^2/g$, more preferably 20–400 $m^2/g$, still more preferably 20–150 $m^2/g$, because the abrasion resistance is further promoted if the specific surface area is within the above-mentioned range. To adjust the particle distribution, two or more kinds of particles having different specific surface areas may be combined.

The zirconium oxide particles may contain those having a crystal structure other than monoclinic and tetragonal as long as the amount thereof is within a range at which the scratch resistance of a film made of the resulting composition is not deteriorated. The amount of the zirconium particles having a crystal structure other than monoclinic and tetragonal is preferably less than 50% by weight, more preferably less than 30% by weight.

The content of the zirconium oxide particles used in the present invention may preferably be 0.01–10% by weight, more preferably 0.05–1% by weight based on the weight of the polyester composition.

The polyester composition according to the present invention may preferably contain inert particles (C) other than the above-described zirconium oxide particles. By incorporating the inert particles (C), slipperiness, abrasion resistance and winding property may be further promoted.

Preferred examples of the inert particles (C) include inert inorganic particles and inert organic particles. Examples of the inert inorganic particles include oxides such as aluminum oxide, silicon oxide and titanium oxide; double oxides such as kaolin and talc; carbonates such as calcium carbonate and barium carbonate; sulfates such as barium sulfate and magnesium sulfate; fluorides such as fluorite; and other generally used inorganic particles such as carbon black. Among these, to obtain prominent effects concerning the slipperiness, abrasion resistance and winding property in combination with the zirconium oxide particles, oxides, double oxides and carbonates, in particular, aluminum oxide, silicon oxide, titanium oxide and calcium carbonate are preferred. These inert inorganic particles may be employed individually or in combination of two or more kinds of particles.

In view of the balance of the slipperiness, abrasion resistance and winding property, the inert particles (C) may preferably have $D_2/D_1$ of 1–10, more preferably 1–5, wherein $D_1$ means the diameter of the particles at 25% in the integrated particle size distribution under sieving, and $D_2$ means the diameter of the particles at 75% in the integrated particle size distribution under sieving.

Examples of the inert organic particles include TEFLON particles, silicone particles, polyimide particles and cross-linked organic particles. Examples of the cross-linked organic particles include divinylbenzene polymers, ethylvinylbenzene-divinylbenzene copolymers, styrene-divinylbenzene copolymers, styrene-ethylvinylbenzene-divinylbenzene copolymers, ethylene glycol dimethacrylate polymers, styrene-ethylene glycol dimethacrylate copolymers, and methyl methacrylate-divinylbenzene copolymers. Among these, ethylvinylbenzene-divinylbenzene copolymer particles are particularly preferred.

In view of the slipperiness, winding property, electromagnetic conversion property due to large protrusions, and abrasion resistance, the inert particles (C) preferably have an average particle size of 0.01–5.0 μm, more preferably 0.05–3.0 μm, still more preferably 0.05–1.0 μm.

The average particle size and the number of particles of the inert particles (C) can be determined as follows.

The polymer is removed from a film by plasma low temperature ashing treatment to expose the particles. The treatment conditions are selected such that the polymer is ashed while the damage to the particles is as small as possible. The particles are observed with a scanning electron microscope (SEM). The image of the particle is treated by an image analyzer so as to calculate the diameter of the corresponding sphere having the same volume as the particle. The magnification of the SEM is appropriately selected from a range of about 2000–10,000 times, and the length of one side of the visual field in one measurement is appropriately selected from a range of 10–50 μm. Changing the observation field, 100–1000 particles are observed. The value (μm) at 50% integration in the particle size distribution of the particles calculated in terms of spheres based on volume is defined as the average particle size d (μm). In cases where the particles are organic particles and the like which are severely damaged by the plasma low temperature ashing treatment, an ultrathin section having a thickness of 0.2 μm was prepared by slicing the film in the direction perpendicular to the surface of the film, and the obtained ultrathin section was observed with a transmission electron microscope (TEM) at a magnification of 3000 to 100,000 times. The average particle size d (μm) was determined by the similar method. The number of particles which satisfy the relationship between a lamination film thickness and an average diameter is determined from volume fraction of the particles and calculated in terms of $mm^2$.

Although the ratio of the components in the divinylbenzene-ethylvinylbenzene copolymer particles is not restricted, the percentage of the amount of divinylbenzene unit in terms of monomer forming the particles is preferably more than 50% by weight, in particular, not less than 54% by weight, since good dispersion of the particles is attained during the polymerization step of the polyester or molding step in melted state. For example, particles prepared by polymerizing a 100% of commercially available divinylbenzene (containing ethylvinylbenzene and a small amount of diethylbenzene in addition to divinylbenzene), and making the polymer into particles are preferred since the divinylbenzene content in the particles is not less than 54% by weight.

The divinylbenzene-ethylvinylbenzene copolymer particles may contain other components such as styrene and polystyrene, as well as diethylbenzene which is an impurity of the commercially available divinylbenzene.

As the divinylbenzene-ethylvinylbenzene copolymer particles, heat-resistant particles having a thermal decomposition temperature (the temperature at 10% loss of weight) of not lower than 390° C., more preferably not lower than 400° C., still more preferably not lower than 410° C. are preferred. If the thermal decomposition temperature is within the above-mentioned range, good slipperiness and abrasion resistance are obtained.

The processes for producing divinylbenzene-ethylvinylbenzene copolymer particles include those in which the particles are synthesized and those in which the particles are produced by pulverization such as that described in Japanese Laid-open Patent Application (Kokai) No. 55-158937. In view of the clogging of the filter due to large particles during the film-formation, and in view of the slipperiness and abrasion resistance, spherical particles having a uniform particle size are preferred. That is, those having a volume shape coefficient of 0.35–π/6 are preferred, and among these, those having a volume shape coefficient of not less than 0.45 are especially preferred, wherein the volume shape coefficient f is expressed by the following equation:

$$f=V/D^3$$

wherein V represents volume of a particle ($\mu m^3$) and D represents the maximum diameter (μm) in the projected plane of the particle.

The above-described divinylbenzene-ethylvinylbenzene copolymer particles which are obtained by known methods can be employed. Examples of the known methods include the methods by emulsion polymerization as follows:

(1) The soap-free polymerization method in which the polymerization is carried out without using an emulsifier or using a very small amount of emulsifier.

(2) The seed polymerization method in which polymer particles are preliminarily added to the polymerization system and then the emulsion polymerization is carried out.

(3) The core-shell polymerization method in which a part of the monomer components is emulsion-polymerized and the remaining monomer is polymerized in the same polymerization system.

(4) The polymerization method employing the Ugelstad disclosed in Japanese Laid-open Patent Application (Kokai) Nos. 54-97582 and 54-126288.

(5) The polymerization method same as the method (4) except that a swelling aid is not used.

To promote the affinity between the divinylbenzene-ethylvinylbenzene copolymer particles and the polyester, it is preferred to use divinylbenzene-ethylvinylbenzene copolymer particles having alkaline metal carboxylate as a functional group. Examples of the alkaline metal salt of carboxylic group include Na salt, K salt and Li salt. Among these, Na salt of carboxylic group is best preferred since the affinity is best promoted. The chemical species having the functional group for introducing the alkaline metal carboxylate is not restricted and may be a monomer or a polymer. Methacrylic acid and acrylic acid as well as polymers thereof are preferred. The chemical species having carboxylic group may have a copolymerized chemical species which does not have a functional group or which has a functional group other than carboxylic group. In this case, in view of heat resistance, styrenes are preferred. The method for introducing alkaline metal carboxylate is not restricted. However, in view of the heat resistance of the particle, it is preferred to first prepare a highly cross-linked mother particle, and then to introduce alkaline metal carboxylate to the surface of the mother particle. For example, a highly cross-linked particle is prepared from divinylbenzene-ethylvinylbenzene copolymer and then carboxylic groups are introduced into the surface of the particle by using methacrylic acid. By changing the pH of the production system of the particles to alkaline, —COONa is introduced on the surface of the particle. The amount of the monomer or the polymer for introducing the alkaline metal carboxylate may preferably be 0.01–20% by weight, more preferably 0.1–10% by weight based on the weight of the mother particle.

The average particle size of the divinylbenzene-ethylvinylbenzene copolymer particles may preferably be 0.01–5 µm, more preferably 0.05–1.0 µm, in view of the abrasion resistance and scratch resistance due to large protrusions.

The content of the inert particles (C) may preferably be 0.01–10% by weight, more preferably 0.05–7% by weight, still more preferably 0.05–2% by weight, still more preferably 0.05–1% by weight based on the weight of the polyester composition in view of slipperiness, winding property, electromagnetic conversion characteristics due to large protrusions, and abrasion resistance.

The thermoplastic polyester composition according to the present invention may be prepared by, for example, mixing with stirring the zirconium oxide particles with a glycol solvent which is a starting material of the desired polyester to obtain a slurry in which the particles are dispersed and adding the slurry to the reaction system of the thermoplastic polyester; or by directly kneading the particles or the slurry with the polymer. In the former method, the slurry may be added at any time, but preferably between before the ester exchange reaction and before reducing the pressure in the polycondensation reaction. In the latter method, the particles may be kneaded into the polyester after drying the particles. Alternatively, a slurry of the particles may be directly kneaded into the polyester while reducing the pressure. In both cases, if the particles are added in the form of the slurry, the kneading may be carried out not only by stirring but also by ultrasonics or by using a medium mill such as sand grinder. In cases where the polyester composition contains the inert particles (C), the inert particles may be mixed with the glycol solvent together with the zirconium oxide particles. Alternatively, the inert particles may be mixed with the glycol solvent separately from the zirconium oxide particles, and one of the slurries is added to the reaction system of preparing the polyester, thereby obtaining polyesters containing one of the zirconium oxide particles and inert particles. The thus prepared polyester containing the zirconium oxide particles and the polyester containing the inert particles are then mixed in the form of chips or in melted state. The latter method in which the polyester containing the zirconium oxide particles and the polyester containing the inert particles (C) are separately prepared is preferred. The polymer containing the inert particles (C) may be prepared by the above-described method in which the particles are directly kneaded with the polyester. Especially, in cases where the inert particles are organic particles, in view of the dispersibility, it is preferred to directly knead the particles in the form of a slurry with the polyester using a kneader having a high shearing force.

The present invention also provides a biaxially oriented polyester film consisting essentially of the above-described polyester according to the present invention.

In an especially preferred mode, the individual zirconium oxide particles (B) contained in the polyester film forms agglomerates, and the length A µm of the agglomerates in the direction parallel to the longitudinal direction of the film and the length B µm of the agglomerates in the direction parallel to the direction perpendicular to the film surface satisfy the following equation (I):

$$0.05 \leq B/A \leq 0.6 \tag{I}$$

It is preferred that equation (I) be satisfied since the scratch resistance and the uniformity of the heights of protrusions are especially good.

The fact that B/A is smaller than 1 means that the agglomerates are oriented in the direction of the film surface by the stretching of the film. If B/A is not less than 0.05 and not more than 0.6, it means that the stretching of the film was uniformly carried out and the agglomerates oriented in the direction of the film surface have a structure which is strong against external force, so that better scratch resistance is obtained than a film having a B/A outside the range mentioned above. Further, by orienting the agglomerates when the film is stretched, protrusions having a uniform height can be formed on the film surface, so that a film having both the high scratch resistance and protrusions having a uniform height can be obtained. B/A is more preferably 0.1–0.5.

The length A of the agglomerates may preferably be 0.01–3.0 µm, more preferably 0.02–1.0 µm, in view of scratch resistance and running property. The length B of the agglomerates may preferably be 0.005–1.5 µm, more preferably 0.01–0.6 µm, in view of scratch resistance and running property. The lengths A and B mean the values at 50% of integration, respectively, in the particle size distribution calculated in terms of spheres based on volume that was determined by slicing the film in the direction perpendicular to the film surface to a thickness of 0.2 µm to obtain an ultrathin section, and observing 100–1000 particles in the section with a transmission electron microscope at a magnification of 20,000–50,000 times.

The ratio of the agglomerates of the zirconium oxide particles (B), which have a length in the direction parallel to the film surface of not more than 0.05 µm may preferably be not less than 20% and not more than 60% in the particle size distribution based on number, because the scratch resistance is promoted and the staining of the calender is decreased if it is within the range mentioned above.

The number of the surface protrusions on the surface of the polyester film, which have a height of not less than 10 nm and not more than 60 nm may preferably be not less than 500,000 protrusions/mm$^2$ and not more than 5,000,000 protrusions/mm$^2$, more preferably not less than 700,000 protrusions/mm$^2$ and not more than 4,000,000 protrusions/mm$^2$ because the scratch resistance is promoted.

The biaxially oriented polyester film according to the present invention may be a monolayer film or a laminate film having at least one film layer containing the zirconium oxide particles.

The laminate film may take various forms. For example, in cases where the laminate film has two layers, it may simply contain a layer (layer A) consisting essentially of the polyester composition according to the present invention and another layer (layer B). In this case, a coating layer (e.g., adhesion-promoting layer) may be formed on the surface of the layer A, or a coating layer (e.g., adhesion-promoting layer) may be formed on the surface of the layer B, or a back coat layer may be formed on the surface of layer B. In cases where the laminate film has three layers, the structure of the laminate may be layer A/layer B/layer A. In this case, a coating layer may be formed on the surface of one of the layers A, or on the surfaces of both of the layers A (i.e., on both surfaces of the laminate film). In this case, the thickness of layer A may preferably be 0.01–3.0 μm, more preferably 0.05–2.0 μm, still more preferably 0.1–1.5 μm, and the thickness of the coating layer may preferably be about 0.1 μm. In cases where the laminate film contains not less than 4 layers, the structure is basically the same as in the above-described three-layered structure while the number of layer B (intermediate layer) is larger, so that the positional relationship between the layer A and the coating layer is the same as the three-layered structure.

In cases where the film is a laminate film, in an especially preferred mode, the film layer containing the zirconium oxide particles contains the inert particles (C), and the inert particles (C) satisfy the following equation (II), and the number of the inert particles satisfying the equation (II) is $5 \times 10^3$ to $1.5 \times 10^5$ numbers/mm$^2$:

$$0.2\ d \leq t \leq 10 d \qquad (II)$$

(wherein d represents the average particle size (μm) of the inert particles (C) and t represents the thickness (μm) of the layer containing the zirconium oxide particles).

When two or more kinds of inert particles (C) are together employed, "d" in the equation (II) means the average particle size of the total inert particles (C). If the above-described equation (II) is satisfied, surface protrusions having a uniform and desired height are formed. By virtue of the surface protrusions having a uniform and desired height, the abrasion resistance under high speed and the electromagnetic conversion characteristics are improved. In a more preferred mode, $0.3 d \leq t \leq 5 d$ is satisfied. Further, if the number of inert particles (C) satisfying the equation (II) is $5 \times 10^3 – 1.5 \times 10^5$ numbers/mm$^2$, more preferably $6 \times 10^3 – 1.2 \times 10^5$ numbers/mm$^2$, good running property and high abrasion resistance under high speed are obtained.

In a more preferred mode wherein the biaxially oriented polyester film is a laminate film, the film layer containing the zirconium oxide particles (B) is arranged as at least one of the outermost layers, this film layer contains the inert particles (C), these inert particles (C) satisfy the above-described equation (II), and the number of protrusion on the surface of the outermost layer is $3 \times 10^3 – 2 \times 10^5$ protrusions/mm$^2$, more preferably $5 \times 10^3 – 1.5 \times 10^5$ protrusions/mm$^2$. If these conditions are met, especially excellent running property and abrasion resistance under high speed are obtained. The protrusions on the surface of the outermost layer herein mean the protrusions having heights of not less than 60 nm, and these protrusions are formed mainly by the inert particles (C).

In the film according to the present invention, a different polymer may be blended in an amount not adversely affecting the effects of the present invention, and organic additives such as antioxidants, heat stabilizers, lubricants and UV absorbers may be added in a usual amount.

The biaxially oriented film according to the present invention can be produced by melt-extruding the thermoplastic polyester composition according to the present invention prepared as described above, according to a conventional method, and by subsequent stretching treatment. That is, for example, the above-described thermoplastic polyester composition is supplied to a known melt-extruder, and the melt is extruded into a form of a sheet from a die in the form of a slit. The sheet is then cooled and solidified on a casting roll to obtain a non-oriented film. In cases where a laminate film is produced, lamination is carried out by using two or more extruders, a plurality of layers of manifold, or a joint block (e.g., a joint block having an angled joining section), and a sheet containing a plurality of layers is extruded from a die. The sheet is cooled on a casting roll to obtain a non-oriented film. In this case, it is effective to arrange a static mixer or a gear pump in the path of the polymer. It is also effective to set the temperature of the extruder which extrudes the polymer at the side of the outermost layer at 5°–10° C. lower than that of the extruder which extrudes the base layer.

The thus obtained non-oriented film is then biaxially stretched to biaxially orient the film. The stretching may be carried out by sequential biaxial stretching method or by simultaneous biaxial stretching method. A sequential stretching method is especially preferred, in which the film is first stretched in the longitudinal direction and then in the transverse direction, wherein the stretching in the longitudinal direction is divided into not less than 3 steps and the total stretching ratio in the longitudinal direction is 3.5–6.5 times the original length. Although the stretching temperature in the longitudinal direction depends on the type of the polyester, it is effective to employ a temperature of 50°–130° C. in the first stretching step, and a higher temperature in the subsequent stretching steps than that employed in the first stretching step. The stretching rate in the longitudinal direction is preferably 5000–50,000%/min. The stretching in the transverse direction is usually carried out by using a stenter. The stretching rate in the transverse direction is preferably 1000–20,000%/min and the stretching temperature is preferably 80°–160° C. The thus obtained oriented film is then heat-set. The temperature of the heat-set is preferably 170°–220° C., more preferably 180°–210° C., and the time is preferably 0.2–20 seconds.

Although the use of the biaxially oriented film according to the present invention is not restricted, it can be especially suitably used as a base film for magnetic recording media.

EXAMPLES

The present invention will now be described in more detail by way of examples. The physical properties described in the examples were measured as follows:

(1) Average Particle Size of Zirconium Oxide Particles

A polyester film containing zirconium oxide particles was cut in the direction perpendicular to the film surface to prepare an ultrathin section having a thickness of 0.2 μm. With a transmission electron microscope, 100–1000 particles in the section was observed under 20,000x–50,000x magnification. The average particle size is defined as the value (μm) at 50% integration in the particle size distribution in terms of corresponding spheres based on volume. The values A and B means the thus determined values in the direction parallel to the film surface and in the direction perpendicular to the film surface, respectively. As for "A", particle size distribution based on number was also measured in the same manner and the ratio of particles having particle sizes of not more than 0.05 μm is indicated in terms of %.

(2) Analysis of Crystal Structures of Zirconium Oxide Particles

The crystal structures of zirconium oxide particles were analyzed by X-ray diffraction measurement (wide angle X-ray diffraction method). An X-ray generation apparatus RU-200B commercially available from RIGAKU DENKI was used, and X-ray source was CuKα ray. A goniometer used was Type 2115D commercially available from RIGAKU DENKI and the counting and recording apparatus used was Type RAD-B commercially available from RIGAKU DENKI. The obtained diffraction patterns were analyzed referring to JCPDS standard data (No. 37-148 and No. 36-420 were used for monoclinic crystal structure, No. 24-1164 was used for tetragonal crystal structure, No. 37-1413 was used for rhombic crystal structure, and No. 27-997 was used for cubic crystal structure.

(3) Average Particle Size and Number of Particles of Inert Particles (C)

The polymer is removed from a film by plasma low temperature ashing treatment to expose the particles. The treatment conditions are selected such that the polymer is ashed while the damage to the particles is as small as possible. The particles are observed with a scanning electron microscope (SEM). The image of the particle is treated by an image analyzer so as to calculate the diameter of the corresponding sphere having the same volume as the particle. The magnification of the SEM is appropriately selected from a range of about 2000–10,000 times, and the length of one side of the visual field in one measurement is appropriately selected from a range of 10–50 µm. Changing the observation field, 100–1000 particles are observed. The value (µm) at 50% integration in the particle size distribution of the particles calculated in terms of spheres based on volume is defined as the average particle size (µm). In cases where the particles are organic particles and the like which are severely damaged by the plasma low temperature ashing treatment, an ultrathin section having a thickness of 0.2 µm was prepared by slicing the film in the direction perpendicular to the surface of the film, and the obtained ultrathin section was observed with a transmission electron microscope (TEM) at a magnification of 3000 to 100,000 times. The average particle size d (µm) was determined by the similar method. The number of particles which satisfy the relationship between a lamination film thickness and an average diameter is determined from volume fraction of the particles and calculated in terms of mm$^2$.

(4) $D_2/D_1$ of Inert Particles (C)

The polymer is removed from a film by plasma low temperature ashing treatment to expose the particles. The treatment conditions are selected such that the polymer is ashed while the damage to the particles is as small as possible. The particles are observed with a scanning electron microscope (SEM). The image of the particle is treated by an image analyzer so as to calculate the diameter of the corresponding sphere having the same volume as the particle. The magnification of the SEM is appropriately selected from a range of about 2000–10,000 times, and the length of one side of the visual field in one measurement is appropriately selected from a range of 10–50 µm. Changing the observation field, 100–1000 particles are observed. The ratio $D_2/D_1$ is the ratio of $D_2$ (µm) that is the diameter of the particles at 75% integration in the particle size distribution under sieving based on volume to $D_1$ (µm) that is the diameter of the particles at 25% integration in the particle size distribution under sieving. In cases where the particles are organic particles and the like which are severely damaged by the plasma low temperature ashing treatment, an ultrathin section having a thickness of 0.2 µm was prepared by slicing the film in the direction perpendicular to the surface of the film, and the obtained ultrathin section was observed with a transmission electron microscope (TEM) at a magnification of 3000 to 100,000 times. The $D_1$ and $D_2$ were determined by the similar method.

(5) Evaluation of Abrasion Resistance (a) Staining of Guide Roll

The polyester composition obtained was made into a biaxially oriented film by the method described in the example. Using a tape running property tester Type TBT300 (commercially available from YOKOHAMA SYSTEM RESEARCH), the film was repeatedly made to run 1000 times at 25° C., 50% RH. Thereafter, the amount of white powder attached to the surface of the guide roll was evaluated by observation with eyes. The diameter of the guide is 6 mm, the material of the guide is SUS27 (surface roughness 0.2S), the winding angle is 180° and the running speed is 6.0 cm/second. The results were rated as follows:

First Grade: The amount of the generated white powder is very small and the object is attained.

Second Grade: The amount of the generated white powder is small and the object is attained.

Third Grade: The amount of the generated white powder is somewhat large and the object is not attained.

Fourth Grade: The amount of the generated white powder is very large and the object is not attained.

(b) Staining of Calender

A tape having a coated magnetic layer is subjected to calender treatment by using a small test calender apparatus (steel roll, nylon roll, 5 steps, the nylon roll contacts the base film surface) at 70° C. under linear pressure of 200 kg/cm. This treatment is continued for 15,000 m and then the white powder generated by this treatment, which is attached to the nylon roll is observed and rated as follows:

First Grade: Substantially no white powder is attached.

Second Grade: Although a small amount of white powder is attached, no troubles are caused in the processing steps and on the performance of the product.

Third Grade: The amount of the attached white powder is large, and troubles are caused in the processing steps and on the performance of the product, so that the film cannot be used.

(c) Evaluation of Scratch Resistance (1)

The film is slit into a tape having a width of ½ inch and the resulting tape is made to run on a guide pin (surface roughness: 0.1 µm in terms of Ra) using a tape running property tester (running speed: 250 m/min; number of running: 1 pass; winding angle: 60°). The scratches given to the film by this operation were observed with a microscope. The number of scratches having a width of not less than 3 µm per the width of the tape was counted, and the results were rated as follows:

A: less than 2 scratches

B: not less than 2 and less than 3 scratches

C: not less than 3 and less than 10 scratches

D: not less than 10 scratches (d) Scratch Resistance (2)

The film is slit into a tape having a width of ½ inch and the resulting tape is made to run on a guide pin (surface roughness: 0.1 µm in terms of Ra) using a tape running property tester (running speed: 1000 m/min; number of running: 20 passes; winding angle: 60°, running tension: 65 g). The scratches given to the film were observed with a microscope and the number of scratches having a width of not less than 2.5 µm per the width of the tape was counted. The films having less than 2 scratches were rated into first grade, those having not less than 2 and less than 3 scratches were rated into second grade, those having not less than 3 and less than 10 scratches were rated into third grade and those having not less than 10 scratches were rated into fourth grade.

(6) Shaving Property under High Speed

The film is slit into a tape having a width of ½ inch. A single-edged blade is pushed into the tape at right angles by 0.5 mm from the surface of the film. Under this condition, the tape is made to run for 200 m (speed: 200 m/min; tension: 100 g). The height of the powder shaved by the blade, which was attached to the blade was measured with a microscope, and the height of the powder (μm) is defined as amount of shaved material. If the amount of shaved material is not more than 180 μm, the shaving property is good, and if it is more than this value, the shaving property is not good.

(7) Evaluation of Surface Irregularities

The obtained polyester composition was made into a biaxially oriented film according to a conventional method and its center line surface roughness Ra was measured according to JIS B-0601 using SURFCOM surface roughness meter under the following conditions: diameter of needle: 2 μm, load: 70 mg, measured length: 0.25 mm, cut-off value: 0.08 mm.

(8) Number and Height of Protrusions

The film surface is scanned using a scanning electron microscope of double detector type (ESM-3200 commercially available from ELIONICS) and a cross section-measuring apparatus (PMS-1, commercially available from ELIONICS) taking the height of the flat plane of the film surface as 0. The measured heights of protrusions are transferred to an image analyzer (IBAS-29000, commercially available from CARLZEIS), and the image of the protrusions on the film surface is regenerated in the image analyzer. The maximum height of each protrusion obtained by converting the protrusion into two-value is defined as the height of the protrusion, and the height of protrusion is determined for each protrusion. This measurement was repeated 500 times and those having a height of not less than 10 nm are defined as protrusions. The average of the heights of protrusions is defined as average height. The number of protrusions having heights of not less than 60 nm was measured by selecting the magnification of the scanning electron microscope from a range of 1000–8000 times, and the number of protrusions having heights of not less than 10 nm and not more than 60 nm was measured by selecting the magnification of the scanning electron microscope from a range of 10,000–50,000 times. In some cases, the information of the heights obtained by using a high precision optical interference type three-dimensional surface analyzer (TOPO-3D, commercially available from WYKO, objective lens: 40–200 magnification, use of a high resolution camera being effective) may be converted into the values measured by SEM.

(9) Slipperiness ($\mu_k$)

The film was slit into a tape having a width of ½ inch. The tape was made to run using a tape running property tester TBT-300 (commercially available from YOKOHAMA SYSTEM RESEARCH) at 20° C., 60%RH. The initial $\mu_k$ was determined according to the equation below. The diameter of the guide was 6 mm, the material of the guide was SUS27 (surface roughness: 0.2S), the winding angle was 180° and the running speed was 3.3 cm/second.

$\mu_k = 0.773 \log (T_1/T_2)$ $T_1$: tension at exit side $T_2$: tension at entrance side Those having a $\mu_k$ of not more than 0.35 have a good slipperiness. If $\mu_k$ is more than 0.35, the slipperiness of the film during the processing or the product made therefrom is extremely bad.

(10) Winding Property

The film having a width of 800 mm and a length of 5000 m was wound into a roll, and the shifted length of the film in the widthwise direction at the end face of the roll was measured, which was rated into the following ranks:

First Grade: less than 0.5 mm
Second Grade: 0.5 mm–less than 1.0 mm
Third Grade: 1.0 mm–less than 3.0 mm
Fourth Grade: 3.0 mm–less than 8 mm
Fifth Grade: 8 mm or more The first grade and the second grade are acceptable.

(11) Electromagnetic Conversion Characteristics

The magnetic coating solution having the composition below is applied on a film with a gravure roll, magnetically oriented and dried. The resultant is subjected to a calender treatment with a small test calender apparatus (steel roll/nylon roll, 5 steps) at 70° C. under linear pressure of 200 kg/cm. Thereafter, the resultant is cured at 70° C. for 48 hours. The thus obtained raw tape was slit into a width of ½ inch to prepare a pancake. From this pancake, a tape having a length of 250 m was taken and incorporated into a VTR cassette to obtain a VTR cassette tape.

| (Composition of Magnetic Coating Solution) | |
|---|---|
| Co-containing iron oxide | 100 parts by weight |
| Vinyl chloride/vinyl acetate copolymer | 10 parts by weight |
| Polyurethane elastomer | 10 parts by weight |
| Polyisocyanate | 5 parts by weight |
| Lecithin | 1 part by weight |
| Methylethyl ketone | 75 parts by weight |
| Methylisobutyl ketone | 75 parts by weight |
| Toluene | 75 parts by weight |
| Carbon black | 2 parts by weight |
| Lauric acid | 1.5 parts by weight |

On this tape, 100% Chroma signal generated by a television test wave generator was recorded using a domestic VTR. The recorded signal was regenerated and Chroma S/N (dB) was measured by a color video noise-measuring apparatus.

(12) Specific Resistance in Melted State

Figure 3:
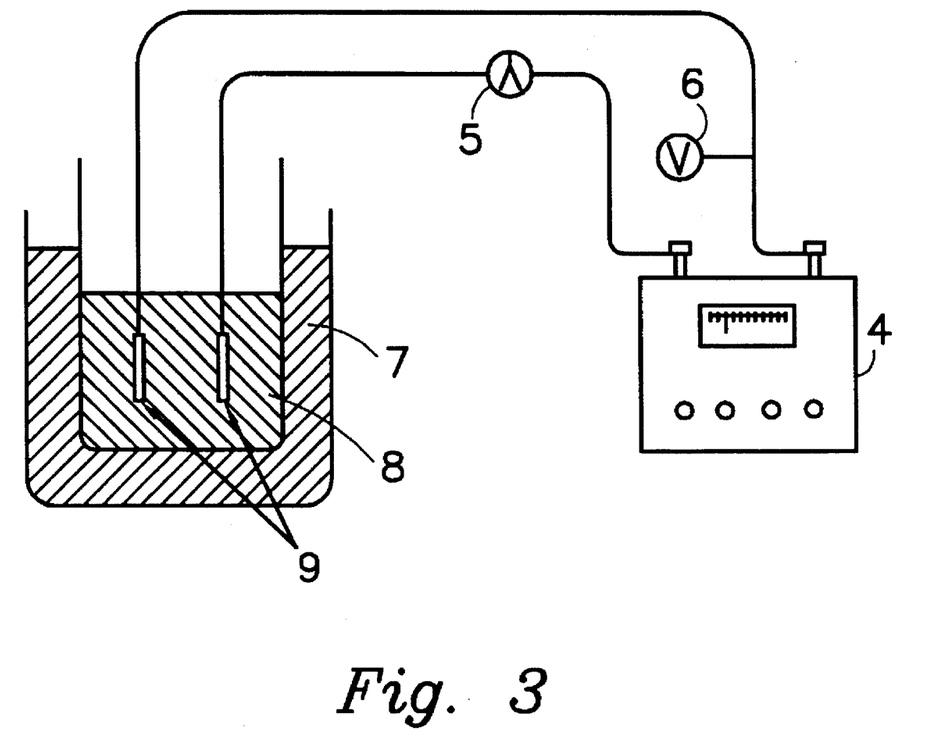
FIG. 3 is an apparatus for measuring melt resistance used for measuring the specific resistance in melted state.

The specific resistance in melted state is measured by using a melt resistance-measuring apparatus shown in FIG. 3. In a vessel in which a pair of electrodes 9 are inserted, polyester 8 which is the test sample is placed. This vessel is immersed in a heating body 7. Polyester 8 is melted at 280° C. under $N_2$ gas atmosphere, and a voltage from a direct current high voltage generator 4 is applied. The melt specific resistance is determined from the indications of an ammeter 5 and voltmeter 6, area of electrode and the distance between the electrodes according to the following equation:

$$\rho = V \times S / I \times D \quad (1)$$

ρ: melt specific resistance (Ω·cm)
V: applied voltage (V)
S: area of electrode (cm²)
I: measured electric current (A)
D: distance between electrodes (cm)

(13) Intrinsic Viscosity of Polymer

Intrinsic viscosity of the polymer was measured in o-chlorophenol solvent at 25° C.

EXAMPLE 1

Figure 1:
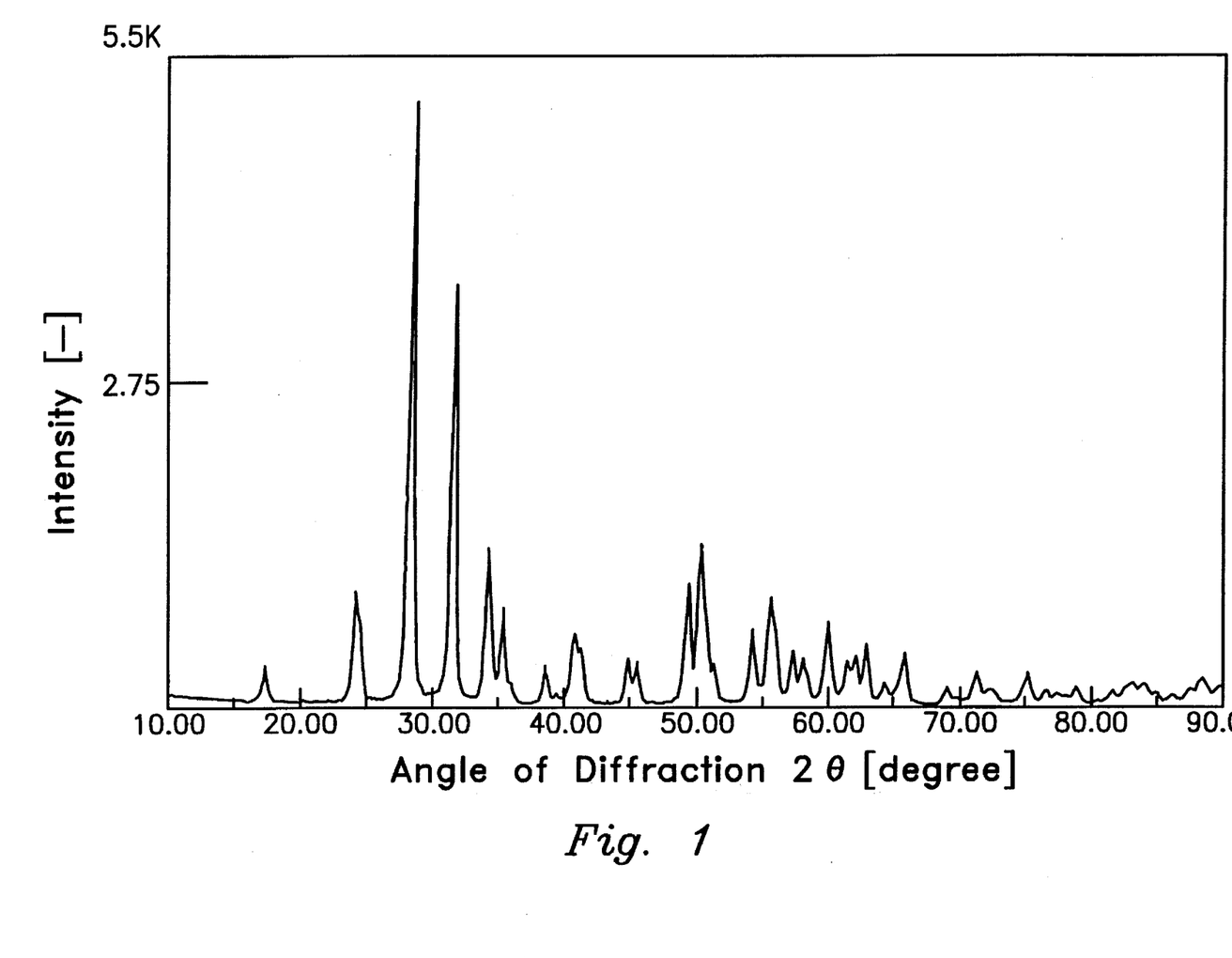
FIG. 1 shows the X-ray diffraction pattern of zirconium oxide particles used in Example 1.

Ten parts by weight of zirconium oxide particles having monoclinic crystal structure having an X-ray diffraction pattern shown in FIG. 1 and 90 parts by weight of ethylene glycol were mixed and the mixture was stirred by a dissolver at room temperature for 1 hour to obtain a zirconium oxide/ethylene glycol slurry (A).

On the other hand, to 100 parts by weight of dimethyl terephthalate and 64 parts by weight of ethylene glycol, 0.06 parts by weight of magnesium acetate was added to carry out ester-exchange reaction. To the reaction product, 2 parts by weight of the slurry (A) prepared as mentioned above, 0.03 parts by weight of antimony oxide which is a catalyst and 0.03 parts by weight of trimethyl phosphate as a heat stabilizer were added to carry out polycondensation reaction, thereby obtaining polyethylene terephthalate composition having an intrinsic viscosity of 0.615. The average particle size determined by observation with a transmission electron microscope was 0.15 μm.

The thus obtained polyethylene terephthalate composition was melt-extruded at 290° C., and the resultant was stretched in longitudinal and transverse directions, respectively, at 90° C. at a stretching ratio of 3 times the original length in each direction. The obtained film was then heat-set at 220° C. for 15 seconds to obtain a biaxially oriented polyethylene terephthalate film having a thickness of 15 μm. The obtained film was evaluated. As a result, Ra was 0.01 μm, evaluation of the guide roll staining was first grade, evaluation of the calender staining was first grade, the scratch resistance was A grade and the abrasion resistance was very good.

EXAMPLES 2–4

Polyethylene terephthalate was prepared and a biaxially oriented film was prepared therefrom in the same manner as in Example 1 except that zirconium oxide particles having crystal structures shown in Tables 1 and 2 were used.

The particle size and the amount of the added particles, intrinsic viscosity, surface roughness of the film and the results of the evaluation of the abrasion resistance are shown in Tables 1 and 2. It can be seen that this film has a good abrasion resistance.

Figure 2:
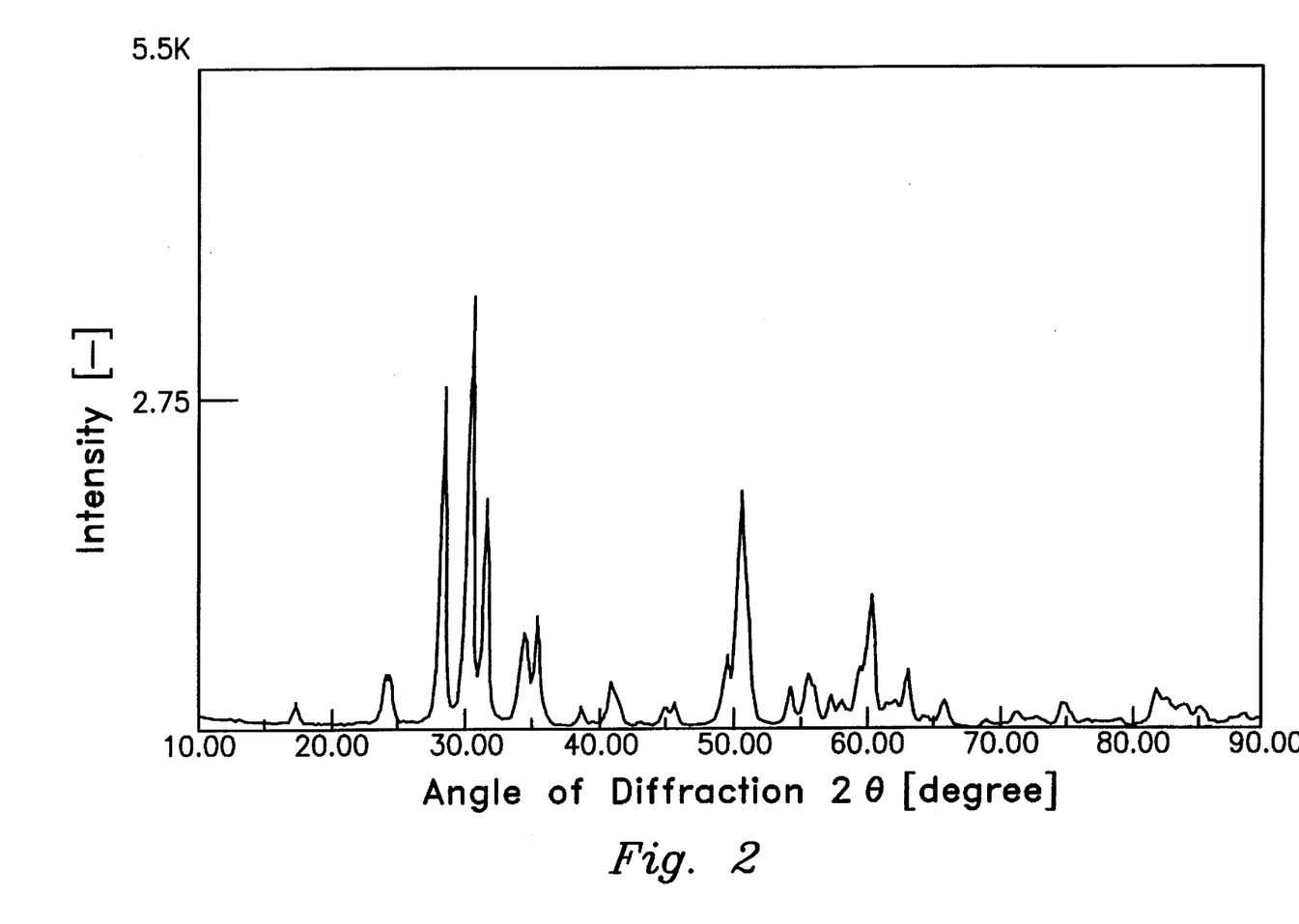
FIG. 2 shows the X-ray diffraction pattern of zirconium oxide particles used in Example 2.

The X-ray diffraction pattern of the zirconium oxide particles used in Example 2 is shown in FIG. 2.

Comparative Examples 1–3

Polyethylene terephthalate was prepared in the same manner as in Example 1 except that particles other than zirconium oxide particles were used. The surface roughness of the film and the results of the evaluation of abrasion resistance are shown in Tables 3 and 4. As can be seen from these tables, a film having a satisfactory abrasion resistance was not obtained.

Comparative Example 4

Polyethylene terephthalate was prepared and a biaxially oriented film was prepared therefrom in the same manner as in Example 1 except that zirconium particles having cubic crystal structure were used.

The particle size and the amount of the added particles, intrinsic viscosity, surface roughness of the film and the results of the evaluation of the abrasion resistance are shown in Table 4.

As can be seen from Table 4, a film having a satisfactory abrasion resistance was not obtained.

EXAMPLE 5

Ten parts by weight of zirconium oxide particles having a specific surface area determined by the B.E.T. method of 31 m$^2$/g and having monoclinic crystal structure and 90 parts by weight of ethylene glycol were mixed and the mixture was stirred by a dissolver at room temperature for 1 hour. The resulting mixture was subjected to a dispersion treatment with a sand grinder to obtain a monoclinic zirconium oxide/ethylene glycol slurry (B).

Ten parts by weight of calcite type calcium carbonate particles (the surfaces thereof were treated with 2 wt % of acrylic acid/ethyl acrylate copolymer (copolymerarization ratio: 8:2, molecular weight: 7000) and 90 parts by weight of ethylene glycol were mixed and the mixture was stirred by a dissolver at room temperature for 1 hour. The resulting mixture was subjected to a dispersion treatment with a sand grinder to obtain a calcium carbonate (average particle size: 0.56 μm)/ethylene glycol slurry (C).

On the other hand, to 100 parts by weight of dimethyl terephthalate and 64 parts by weight of ethylene glycol, 0.06 parts by weight of magnesium acetate was added to carry out ester-exchange reaction. To the reaction product, 10 parts by weight of the slurry (B) prepared as mentioned above, 0.03 parts by weight of antimony oxide which is a catalyst and 0.03 parts by weight of trimethyl phosphate as a heat stabilizer were added to carry out polycondensation reaction, thereby obtaining polyethylene terephthalate composition (I) having an intrinsic viscosity of 0.621.

The same procedure was repeated except that the slurry (C) was added in place of slurry (B) to obtain a polyethylene terephthalate composition (II) having an intrinsic viscosity of 0.622.

Chips of the above-mentioned polyethylene terephthalate compositions (I) and (II), and of a polyethylene terephthalate composition (III) containing no particles were mixed at a weight ratio of 50:30:20, and the mixture was dried at 140° C. for 3 hours. The obtained polyethylene terephthalate composition was melt-extruded at 290° C., and the resultant was stretched in longitudinal and transverse directions, respectively, at 90° C. at a stretching ratio of 3 times the original length in each direction. The obtained film was then heat-set at 220° C. for 5 seconds to obtain a biaxially oriented polyethylene terephthalate film having a thickness of 15 μm. The obtained film was evaluated. As shown in Table 5, Ra was 0.024 μm, coefficient of kinetic friction $\mu_k$ was 0.31, evaluation of the winding property was first grade and the evaluation of the scratch resistance (2) was first grade. Thus, the film was an excellent film.

EXAMPLES 6, 7, AND 8

Biaxially oriented polyester films were obtained in the same manner as in Example 5 except that the specific surface area and the amount of the added zirconium oxide particles, and the material, the particle size and the amount of added inert particles were changed.

The characteristics of the obtained films are shown in Table 5. These films had very good winding properties and scratch resistances. No surface treatment was performed on the titanium oxide particles and the silica particles. The calcium carbonate used in Example 8 was vaterite type and surface treatment as in Example 1 was performed.

EXAMPLE 9

A slurry was prepared and polycondensation reaction was carried out in the same manner as in Example 5 except that zirconium oxide particles having a specific surface area determined by the B.E.T. method of 43 m²/g and having monoclinic structure to obtain a polyethylene terephthalate composition (IV) having an intrinsic viscosity of 0.618.

Then 100 parts of an aqueous slurry containing 20 parts by weight of divinylbenzene/ethylvinylbenzene copolymer particles [obtained by polymerizing 100% of commercially available divinylbenzene (divinylbenzene 55%, ethylvinylbenzene 40% and diethylvinylbenzene 5%)] having a thermal decomposition temperature of 405° C. and an average particle size of 0.43 μm was mixed with 500 parts by weight of a polyethylene terephthalate containing no particles in melted state. The mixing was carried out using a biaxial kneader having a vent. The polyester was melted in the kneader at 280°–290° C. and the above-mentioned aqueous slurry was added thereto while removing the accompanying water from the vent in the form of vapor. The kneading was performed biaxially under reduced pressure for a dwelling time of 5 minutes. By this operation, a polyethylene terephthalate composition (V) containing divinylbenzene/ethylvinylbenzene copolymer particles, which had an intrinsic viscosity of 0.615 was obtained.

Chips of the above-mentioned polyesters (III), (IV) and (V) were mixed at a weight ratio of 50:15:35 ((IV):(V);(III)) and the mixture was dried at 140° C. for 3 hours. From the resultant, a biaxially oriented polyester film was prepared in the same manner as in Example 5.

Ra was 0.024, coefficient of kinetic friction was 0.20, evaluation of the winding property was first grade and the evaluation of the scratch resistance (2) was first grade. Thus, the film was an excellent film.

EXAMPLES 10 AND 11

Biaxially oriented polyester films were obtained in the same manner as in Example 9 except that the specific surface area, the added amount and the crystal structure of the zirconium oxide particles, and the material, particle size and the added amount of the inert organic particles were changed. The characteristics of the obtained films are shown in Table 6. As can be seen, the films had very good running properties (coefficients of kinetic friction), winding properties, scratch resistances and so on.

EXAMPLES 12

Polyethylene terephthalate compositions were prepared in the same manner as in Example 5 except that the specific surface area and the added amount of the zirconium oxide particles, and the particle size of the calcium carbonate particles were changed. On the other hand, a polyethylene terephthalate composition was prepared in the same manner as in Example 9 except that the copolymerization ratio and particle size of the divinylbenzene/ethylvinylbenzene copolymer particles were changed.

Using these polyethylene terephthalate compositions, a biaxially oriented polyester film was prepared in the same manner as in Example 5.

The characteristics of the obtained film are shown in Table 6. As shown, the running property (coefficient of kinetic friction), winding property, scratch resistance and so on of the film were excellent.

EXAMPLE 13

Polyethylene terephthalate compositions were prepared in the same manner as in Example 5 except that the specific surface area of zirconium oxide particles, particle size and $D_2/D_1$ of the calcium carbonate particles were changed.

These master chips and polyethylene terephthalate chips containing no particles were mixed so as to attain the particle content shown in Table 7. The resulting mixture was supplied to a vent type biaxial knead-extruder 1 and melted at 280° C. (polymer X). Pellets containing no particles were dried at 180° C. for 3 hours under reduced pressure (3 Torr). The resultant was supplied to another extruder 2 and melted at 290° C. (polymer Y). The thus obtained two kinds of polymers were subjected to high precision filtration and laminated such that polymer Y is positioned to form the base layer of which both surfaces are coated with polymer X by using a three-layered joining block having a rectangular laminating part. The resultant was extruded from a fish tail-shaped die to obtain a sheet and the resulting sheet was cooled and solidified by being wound about a static-charged casting drum having a surface temperature of 30° C. to obtain a non-oriented film having a thickness of about 160 μm. The draft ratio at this time was 6.5.

The non-oriented film was stretched in the longitudinal direction in three steps, that is, at 123° C. at a stretching ratio of 1.2 times the original length, at 126° C. at a stretching ratio of 1.45 times the original length, and at 114° C. at a stretching ratio of 2.3 times the original length. The resulting unioiriented film was stretched in the transverse direction in two steps, that is, at 111° C. at a stretching ratio of 3.7 times the original length and at 113° C. at a stretching ratio of 1.2 times the original length. The resulting film was then heat-set at 200° C. for 5 seconds at a constant length to obtain a film having a thickness of 13 μm. The thickness t of the surface layers of the thus obtained film was 1.0 μm and the relationship of t=1.64d was satisfied, wherein d means the average particle size of the calcium carbonate particles. B/A was 0.3.

The characteristics of this film are shown in Table 7. As can be seen, the running property (coefficient of kinetic friction $\mu_k$), the scratch resistance and so on were excellent. Further, the electromagnetic conversion characteristics were evaluated. As a result, the Chroma S/N was +2.0 dB based on Example 5.

Thus, the laminate film having the surface layer made of the polyester composition of the present invention has not only good running property and scratch resistance, but also good electromagnetic conversion characteristics.

EXAMPLES 14–20

A biaxially oriented laminate polyester film was obtained in the same manner as in Example 13 except that the crystal structure and specific surface area of the zirconium oxide particles, the material and particle size of the inert particles, and the thickness of the coated layers were changed.

The characteristics of these films are shown in Tables 7 and 8. As can be seen, these films had good running properties (coefficient of kinetic friction $\mu_k$), scratch resistances and electromagnetic conversion characteristics.

It should be noted that the polyethylene terephthalate compositions containing divinylbenzene/ethylvinylbenzene copolymer particles were prepared in the same manner as in Example 9.

EXAMPLE 21

In a flask equipped with a rectification tower, 100 parts by weight of dimethyl terephthalate, 1 part by weight of dimethyl 5-sodiumsulfoisophthalate and 70 parts by weight of ethylene glycol were placed and the mixture was melted at 160° C. To the resultant, 0.06 parts by weight of magnesium acetate as a catalyst was added and the resulting mixture was heated to 240° C. for 3 hours while removing methanol generated by the heating from the rectification tower. After confirming that a prescribed amount of methanol was removed, 0.4 parts by weight of zirconium oxide/ethylene glycol slurry used in Example 4 was added and then 0.03 parts by weight of antimony trioxide and 0.03 parts by weight of trimethyl phosphate were added. The resultant was subjected to polycondensation in a conventional manner to obtain a copolymerized aromatic polyethylene terephthalate composition (VI) having an intrinsic viscosity of 0.681.

The particle size of the particles in this polymer was 0.11 μm, so that the diameter of the agglomerates was smaller than in Example 4, and the agglomerates were well dispersed.

A biaxially oriented film was prepared from this polymer in the same manner as in Example 1. Ra of the film was 0.009 μm, the evaluation of the guide roll staining was second grade, the scratch resistance was B grade which was the same as that of Example 4, but the evaluation of the calender staining was first grade.

EXAMPLE 22

To 100 parts by weight of dimethyl terephthalate and 90 parts by weight of ethylene glycol, 0.06 parts of magnesium acetate and 0.1 part by weight of lithium acetate (containing 0.03 parts by weight of antimony oxide) were added and the mixture was gradually heated to 145°–235° C. for 3.5 hours, thereby completing ester-exchange reaction while allowing methanol to effuse.

To the reaction product, a slurry containing 0.6 parts by weight of magnesium acetate in 3.5 parts by weight of ethylene glycol was added. Ten minutes later, a slurry containing 0.25 parts by weight of trimethyl phosphate in 3.5 parts by weight of ethylene glycol was added and then 2 parts by weight of the zirconium oxide/ethylene glycol slurry (A) used in Example 1 was added. Thereafter, excess ethylene glycol was evaporated off. The resulting reaction product was transferred to a polycondensation reactor and polycondensation reaction was carried out for 3.0 hours in a conventional manner to obtain a polyethylene terephthalate composition having an intrinsic viscosity of 0.616. The melt specific resistance at 280° C. was $7 \times 10^6$ Ω·cm. The average particle size of the particles was 0.15 μm.

A biaxially oriented polyester film was prepared using the thus obtained polyethylene terephthalate composition in the same manner as in Example 1. The evaluation of the guide roll staining was first grade, the evaluation of the scratch resistance (1) was A grade, 0 and the evaluation of the calender staining was first grade. The static-charged casting property during the film-formation was also good, so that the film had an excellent film-forming property.

Comparative Examples 5–8

Biaxially oriented polyester films were prepared in the same manner as in Example 5 except that the crystal structure and the specific surface area of the zirconium oxide particles, material and particle size of the inert particles were changed.

The characteristics of these films are shown in Table 9. As can be seen, they had poor scratch resistances.

It should be noted that the polyethylene terephthalate compositions containing divinylbenzene/ethylvinylbenzene copolymer particles were prepared in the same manner as in Example 9.

Comparative Examples 9–11

Biaxially oriented polyester laminate films were prepared in the same manner as in Example 13 except that the crystal structure and the specific surface area of the zirconium oxide particles, material and particle size of the inert particles were changed.

The characteristics of these films are shown in Table 10. As can be seen, they had poor scratch resistances and electromagnetic conversion characteristics.

It should be noted that Comparative Examples 9 and 10 are cases where zirconium oxide particles are not contained and Comparative Example 11 is a case where zirconium oxide particles having a different crystal structure were employed.

TABLE 1

|  |  | Example 1 | Example 2 |
|---|---|---|---|
| Added Particles | Material of Particles | Zirconium Oxide | Zirconium Oxide |
|  | Crystal Structure | Monoclinic 100% | Monoclinic 55% Tetragonal 45% |
|  | Particle Size (μm) | 0.15 | 0.20 |
|  | Amount Added in Film* | 0.20 | 0.10 |
| Polyester Composition | Intrinsic Viscosity | 0.615 | 0.620 |
| Film Characteristics | Surface Roughness Ra (μm) | 0.010 | 0.012 |
|  | Evaluation of Guide Roll Staining | First Grade | First Grade |
|  | Evaluation of Calender Staining | First Grade | First Grade |
|  | Evaluation of Scratch Resistance | A Grade | B Grade |

*1 Parts by weight with respect to 100 parts by weight of polyester

TABLE 2

|  |  | Example 3 | Example 4 |
|---|---|---|---|
| Added Particles | Material of Particles | Zirconium Oxide | Zirconium Oxide |
|  | Crystal Structure | Monoclinic 100% | Monoclinic 100% |
|  | Particle Size (μm) | 0.04 | 0.15 |
|  | Amount Added in Film* | 0.30 | 0.04 |
| Polyester Composition | Intrinsic Viscosity | 0.625 | 0.630 |
| Film Characteristics | Surface Roughness Ra (μm) | 0.007 | 0.009 |
|  | Evaluation of Guide Roll Staining | Second Grade | Second Grade |
|  | Evaluation of Calender Staining | Second Grade | Second Grade |
|  | Evaluation of Scratch Resistance | A Grade | B Grade |

*1 Parts by weight with respect to 100 parts by weight of polyester

TABLE 3

|  |  | Comparative Example 1 | Comparative Example 2 |
|---|---|---|---|
| Added Particles | Material of Particles | Calcium Carbonate | Titanium Oxide |
|  | Crystal Structure | — | — |
|  | Particle Size (μm) | 0.30 | 0.32 |
|  | Amount Added in Film* | 0.50 | 0.30 |
| Polyester Composition | Intrinsic Viscosity | 0.613 | 0.620 |
| Film Characteristics | Surface Roughness Ra (μm) | 0.014 | 0.015 |
|  | Evaluation of Guide Roll Staining | Fourth Grade | Third Grade |
|  | Evaluation of Calender Staining | Fourth Grade | Third Grade |
|  | Evaluation of Scratch Resistance | D Grade | C Grade |

*1 Parts by weight with respect to 100 parts by weight of polyester

TABLE 4

|  |  | Comparative Example 3 | Comparative Example 4 |
|---|---|---|---|
| Added Particles | Material of Particles | Kaoline | Zirconium Oxide |
|  | Crystal Structure | — | Cubic 100% |
|  | Particle Size (μm) | 1.16 | 0.15 |
|  | Amount Added in Film* | 0.20 | 0.20 |
| Polyester Composition | Intrinsic Viscosity | 0.617 | 0.615 |
| Film Characteristics | Surface Roughness Ra (μm) | 0.018 | 0.010 |
|  | Evaluation of Guide Roll Staining | Fourth Grade | Second Grade |
|  | Evaluation of Calender Staining | Fourth Grade | Third Grade |
|  | Evaluation of Scratch Resistance | D Grade | B Grade |

*1 Parts by weight with respect to 100 parts by weight of polyester

TABLE 5

|  |  | Example 5 | Example 6 | Example 7 | Example 8 |
|---|---|---|---|---|---|
| Zirconium Oxide Particles | Specific Surface Area (m²/g) | 31 | 65 | 38 | 72 |
|  | Crystal Structure | Monoclinic 100% | Monoclinic 100% | Monoclinic 100% | Monoclinic 100% |
|  | Added Amount (wt %) | 0.5 | 0.3 | 0.3 | 0.4 |
|  | A (μm) | 0.16 | 0.18 | 0.21 | 0.21 |
|  | B/A | 0.3 | 0.2 | 0.2 | 0.3 |
|  | Number-based A (%) | 35 | 45 | 35 | 51 |
| Inert Particles | Material of Particles | Calcium Carbonate | Titanium Oxide | Silica | Calcium Carbonate/Silica |
|  | Particle Size (μm) | 0.56 | 0.32 | 0.43 | 0.52/0.50 |
|  | Added Amount (wt %) | 0.3 | 0.5 | 0.2 | 0.2/0.1 |
|  | $D_2/D_1$ | 2.7 | 3.0 | 2.0 | 3.1/2.1 |
| Film | Ra (μm) | 0.024 | 0.021 | 0.022 | 0.025 |
|  | Coefficient of Kinetic Friction ($\mu_k$) | 0.31 | 0.40 | 0.28 | 0.26 |
|  | Winding Property | 1 | 1 | 1 | 1 |
|  | Scratch Resistance (2) | 1 | 1 | 2 | 1 |

Number-based A: Ratio (%) of A of not more than 0.05 μm based on number

TABLE 6

| | | Example | | | |
|---|---|---|---|---|---|
| | | 9 | 10 | 11 | 12 |
| Zirconium Oxide Particles | Specific Surface Area (m²/g) | 43 | 58 | 32 | 81 |
| | Crystal Structure | Monoclinic 100% | Monoclinic 100% | Monoclinic 90% Tetragonal 10% | Monoclinic 100% |
| | Added Amount (wt %) | 0.5 | 0.3 | 0.3 | 0.4 |
| | A (μm) | 0.21 | 0.20 | 0.25 | 0.19 |
| | B/A | 0.2 | 0.2 | 0.4 | 0.3 |
| | Number-based A (%) | 42 | 51 | 26 | 55 |
| Inert Particles | Material of Particles | DBV.EBV(1) | DBV.EBV(1) | DBV.EBV(2) | Calcium Carbonate/ Silica |
| | Particle Size (μm) | 0.43 | 0.38 | 0.52 | 0.48/0.45 |
| | Added Amount (wt %) | 0.3 | 0.5 | 0.2 | 0.3/0.1 |
| | $D_2/D_1$ | 2.2 | 2.2 | 2.1 | 3.3/2.0 |
| | Ra (μm) | 0.024 | 0.024 | 0.022 | 0.025 |
| Film | Coefficient of Kinetic Friction ($\mu_k$) | 0.20 | 0.18 | 0.19 | 0.21 |
| | Winding Property | 1 | 2 | 1 | 1 |
| | Scratch Resistance (2) | 1 | 1 | 1 | 1 |

DBV.EBV(1): divinylbenzene/ethylvinylbenzene (55/45) copolymer (modified with —COONa)
DBV.EBV(2): divinylbenzene/ethylvinylbenzene (70/30) copolymer (modified with —COONa)
Number-based A: Ratio (%) of A of not more than 0.05 μm based on number

TABLE 7

| | | Example 13 | Example 14 | Example 15 | Example 16 |
|---|---|---|---|---|---|
| Zirconium Oxide Particles | Specific Surface Area (m²/g) | 28 | 49 | 61 | 39 |
| | Crystal Structure | Monoclinic 100% | Monoclinic 100% | Monoclinic 80% Tetragonal 20% | Monoclinic 100% |
| | Added Amount (wt %) | 0.5 | 0.3 | 0.3 | 0.4 |
| | A (μm) | 0.21 | 0.16 | 0.27 | 0.22 |
| | B/A | 0.3 | 0.5 | 0.3 | 0.2 |
| | Number-based A (%) | 31 | 42 | 38 | 39 |
| Inert Particles | Material of Particles | Calcium Carbonate | Silica | Calcium Carbonate | DBV.EBV(2) |
| | Particle Size (μm) | 0.61 | 0.42 | 0.48 | 0.45 |
| | Added Amount (wt %) | 0.5 | 0.4 | 0.6 | 0.4 |
| | $D_2/D_1$ | 3.6 | 2.1 | 2.8 | 2.0 |
| Film | Thickness of Coated Layer (μm) | 1.0 | 0.8 | 1.2 | 1.0 |
| | Ra (μm) | 0.024 | 0.021 | 0.025 | 0.023 |
| | Number of Inert Particles C (particles/mm²) | $1.5 \times 10^4$ | $1.2 \times 10^4$ | $1.8 \times 10^4$ | $1.5 \times 10^4$ |
| | Number of Protrusions over 60 nm (protrusions/mm²) | $2 \times 10^4$ | $1.8 \times 10^4$ | $2.2 \times 10^4$ | $2 \times 10^4$ |
| | Number of Protrusions of 10–60 nm (protrusions/mm²) | $200 \times 10^4$ | $180 \times 10^4$ | $150 \times 10^4$ | $190 \times 10^4$ |
| | Coefficient of Kinetic Friction ($\mu_k$) | 0.31 | 0.29 | 0.30 | 0.17 |
| | Scratch Resistance (2) | 1 | 2 | 1 | 1 |
| | Shaving Property under High Speed (μm) | 100 | 110 | 90 | 65 |
| | Electromagnetic Conversion Characteristics (dB) | +2.0 | +1.8 | +2.1 | +2.0 |

Electromagnetic Conversion Characteristics: Calculated based on Example 5
Number-based A: Ratio (%) of A of not more than 0.05 μm based on number

TABLE 8

|  |  | Example 17 | Example 18 | Example 19 | Example 20 |
|---|---|---|---|---|---|
| Zirconium Oxide Particles | Specific Surface Area (m²/g) | 71 | 33 | 92 | 67 |
|  | Crystal Structure | Monoclinic 90% Tetragonal 10% | Monoclinic 100% | Monoclinic 100% | Monoclinic 70% Tetragonal 30% |
|  | Added Amount (wt %) | 0.3 | 0.5 | 0.3 | 0.3 |
|  | A (μm) | 0.28 | 0.23 | 0.23 | 0.28 |
|  | B/A | 0.4 | 0.4 | 0.2 | 0.3 |
|  | Number-based A (%) | 43 | 37 | 57 | 38 |
| Inert Particles | Material of Particles | DBV.EBV(1) | Calcium Carbonate/Silica | Calcium Carbonate/DBV.EBV(2) | Kaoline/DBV.EBV(1) |
|  | Particle Size (μm) | 0.37 | 0.52/0.45 | 0.48/0.43 | 0.71/0.50 |
|  | Added Amount (wt %) | 0.5 | 0.5/0.05 | 0.5/0.05 | 0.4/0.1 |
|  | $D_2/D_1$ | 2.1 | 3.1/2.1 | 3.3/2.2 | 4.2/2.2 |
| Film | Thickness of Coated Layer (μm) | 0.8 | 1.0 | 1.0 | 1.5 |
|  | Ra (μm) | 0.022 | 0.023 | 0.024 | 0.025 |
|  | Number of Inert Particles C (particles/mm²) | $1.8 \times 10^4$ | $1.5 \times 10^4$ | $1.5 \times 10^4$ | $1.0 \times 10^4$ |
|  | Number of Protrusions over 60 nm (protrusions/mm²) | $2.3 \times 10^4$ | $2 \times 10^4$ | $2. \times 10^4$ | $1.5 \times 10^4$ |
|  | Number of Protrusions of 10–60 nm (protrusions/mm²) | $140 \times 10^4$ | $200 \times 10^4$ | $150 \times 10^4$ | $130 \times 10^4$ |
|  | Coefficient of Kinetic Friction ($\mu_k$) | 0.19 | 0.23 | 0.29 | 0.22 |
|  | Scratch Resistance (2) | 1 | 2 | 1 | 2 |
|  | Shaving Property under High Speed (μm) | 60 | 100 | 65 | 70 |
|  | Electromagnetic Conversion Characteristics (dB) | +2.0 | +2.1 | +2.2 | +1.6 |

Number-based A: Ratio (%) of A of not more than 0.05 μm based on number
Electromagnetic Conversion Characteristics: Calculated based on Example 5

TABLE 9

|  |  | Comparative Example | | | |
|---|---|---|---|---|---|
|  |  | 5 | 6 | 7 | 8 |
| Zirconium Oxide Particles | Specific Surface Area (m²/g) | 45 | 58 | 52 | 60 |
|  | Crystal Structure | Orthorhombic 100% | Orthorhombic 50% Cubic 50% | Cubic 100% | Orthorhombic 100% |
|  | Added Amount (wt %) | 0.3 | 0.3 | 0.2 | 0.3 |
|  | A (μm) | 0.31 | 0.42 | 0.47 | 0.32 |
|  | B/A | 0.5 | 0.6 | 0.5 | 0.4 |
|  | Number-based A (%) | 33 | 40 | 21 | 63 |
| Inert Particles | Material of Particles | Calcium Carbonate | Calcium Carbonate | DBV.EBV(1) | Calcium Carbonate/Silica |
|  | Particle Size (μm) | 0.56 | 0.42 | 0.46 | 0.62/0.44 |
|  | Added Amount (wt %) | 0.3 | 0.4 | 0.3 | 0.2/0.2 |
|  | $D_2/D_1$ | 3.7 | 3.6 | 2.2 | 3.8/2.1 |
| Film | Ra (μm) | 0.023 | 0.024 | 0.023 | 0.024 |
|  | Coefficient of Kinetic Friction ($\mu_k$) | 0.30 | 0.30 | 0.21 | 0.28 |
|  | Winding Property | 2 | 3 | 2 | 2 |
|  | Scratch Resistance (2) | 3 | 3 | 3 | 4 |

Number-based A: Ratio (%) of A of not more than 0.05 μm based on number

TABLE 10

|  |  | Comparative Example 9 | Comparative Example 10 | Comparative Example 11 |
|---|---|---|---|---|
| Zirconium Oxide Particles | Specific Surface Area (m²/g) | — | — | 36 |
|  | Crystal Structure | — | — | Orthorhombic 100% |
|  | Added Amount (wt %) | — | — | 0.3 |
|  | A (μm) | — | — | 0.33 |
|  | B/A | — | — | 0.5 |
|  | Number-based A (%) | — | — | 18 |
| Inert Particles | Material of Particles | Calcium Carbonate | Silica | Calcium Carbonate |
|  | Particle Size (μm) | 0.42 | 0.45 | 0.53 |
|  | Added Amount (wt %) | 0.5 | 0.5 | 2.3 |
|  | $D_2D_1$ | 3.6 | 2.1 | 3.8 |
| Film | Thickness of Coated Layer (μm) | 1.0 | 1.0 | 1.5 |
|  | Ra (μm) | 0.022 | 0.023 | 0.037 |
|  | Number of Inert Particles C (particles/mm²) | $1.5 \times 10^4$ | $1.5 \times 10^4$ | $1.8 \times 10^4$ |
|  | Number of Protrusions over 60 nm (protrusions/mm²) | $2 \times 10^4$ | $2 \times 10^4$ | $2.5 \times 10^4$ |
|  | Number of Protrusions of 10–60 nm (protrusions/mm²) | less than $1 \times 10^4$ | less than $1 \times 10^4$ | $3.5 \times 10^4$ |
|  | Coefficient of Kinetic Friction ($\mu_k$) | 0.31 | 0.30 | 0.30 |
|  | Scratch Resistance (2) | 4 | 4 | 3 |
|  | Shaving Property under High Speed (μm) | 90 | 130 | 280 |
|  | Electromagnetic Conversion Characteristics (dB) | −0.3 | −0.5 | −0.2 |

Number-based A: Ratio (%) of A of not more than 0.05 μm based on number
Electromagnetic Conversion Characteristics: Calculated based on Example 5

We claim:

1. A biaxially oriented polyester film consisting essentially of a polyester composition comprising a thermoplastic polyester (A) and zirconium oxide particles (B) having monoclinic and/or tetragonal crystal structure.

2. The biaxially oriented polyester film according to claim 1, wherein said zirconium oxide particles (B) contained in said polyester film are in the form of agglomerates formed by individual particles, the length A μm of said agglomerates in the direction parallel to the longitudinal direction of said film and the length B μm of the agglomerates in the direction parallel to the direction perpendicular to the film surface satisfying the following equation (I):

$$0.05 \leq B/A \leq 0.6 \qquad (I)$$

3. The biaxially oriented film according to claim 1 or 2, wherein the percentage of said agglomerates of said zirconium oxide particles (B), which have a length in the direction parallel to the film surface of not more than 0.05 μm is not less than 20% and not more than 60% in the particle size distribution based on number.

4. The biaxially oriented polyester film according to claim 1 or 2, wherein the number of surface protrusions on the polyester film surface, which have heights of not less than 10 nm and not more than 60 nm is not less than 500,000 protrusions/mm² and not more than 5,000,000 protrusions/mm².

5. The biaxially oriented polyester film according to any one of claims 1–4, wherein said polyester film is a laminate film having at least one film layer containing said zirconium oxide particles (B).

6. The biaxially oriented polyester film according to claim 5, wherein said film layer containing said zirconium oxide particles (B) contains inert particles (C), said inert particles (C) satisfying the following equation (II), and the number of said inert particles satisfying the equation (II) being $5 \times 10^3$ to $1.5 \times 10^5$ numbers/mm²:

$$0.2 \, d \leq t \leq 10d \qquad (II)$$

(wherein d represents average particle size (μm) of the inert particles (C) and t represents the thickness (μm) of said film layer containing said zirconium oxide (B) particles).

7. The biaxially oriented polyester film according to claim 5, wherein said film layer containing said zirconium oxide particles (B) is arranged at least one of the outermost layers, said film layer containing inert particles (C), these inert particles (C) satisfying the following equation (II), and the number of protrusions on the surface of said outermost layer being $3 \times 10^3 – 2 \times 10^5$ protrusions/mm².

$$0.2 \, d \leq t \leq 10d \qquad (II)$$

(wherein d represents average particle size (μm) of the inert particles (C) and t represents the thickness (μm) of said film layer containing said zirconium oxide (B) particles).

8. The biaxially oriented polyester film according to any one of claims 1–7, which is a base film for magnetic recording media.

* * * * *